United States Patent
Summey et al.

(10) Patent No.: US 8,520,366 B2
(45) Date of Patent: Aug. 27, 2013

(54) SOLID ELECTROLYTIC CAPACITOR AND METHOD OF MANUFACTURE

(75) Inventors: Brandon Summey, Simpsonville, SC (US); Jeffrey Poltorak, Fountain Inn, SC (US); Philip M. Lessner, Newberry, SC (US); Yongjian Qiu, Greenville, SC (US); Randolph S. Hahn, Simpsonville, SC (US); David Jacobs, Greer, SC (US); Keith R. Brenneman, Simpsonville, SC (US); Albert Harrington, Fountain Inn, SC (US); Chris Stolarski, Greenville, SC (US)

(73) Assignee: Kemet Electronics Corporation, Simpsonville, SC (US)

( * ) Notice: Subject to any disclaimer, the term of this patent is extended or adjusted under 35 U.S.C. 154(b) by 271 days.

(21) Appl. No.: 12/975,662

(22) Filed: Dec. 22, 2010

(65) Prior Publication Data
US 2011/0149477 A1    Jun. 23, 2011

Related U.S. Application Data

(60) Provisional application No. 61/289,148, filed on Dec. 22, 2009, provisional application No. 61/384,785, filed on Sep. 21, 2010.

(51) Int. Cl.
*H01G 9/15* (2006.01)

(52) U.S. Cl.
USPC ........... 361/528; 361/523; 361/525; 361/529; 361/516; 361/519; 29/25.01; 29/25.03

(58) Field of Classification Search
USPC ................ 361/523, 525, 528–529, 516–519, 361/530.535; 29/25.01–25.03
See application file for complete search history.

(56) References Cited

U.S. PATENT DOCUMENTS

| | | | |
|---|---|---|---|
| 6,185,091 B1 | 2/2001 | Tanahashi et al. | 361/529 |
| 6,239,965 B1 | 5/2001 | Shiraishi et al. | 361/511 |
| 6,310,765 B1 | 10/2001 | Tanahashi et al. | 361/516 |
| 6,819,546 B2 | 11/2004 | Kuriyama | 361/535 |
| 7,161,797 B2 | 1/2007 | Vaisman et al. | 361/540 |
| 7,417,844 B2 | 8/2008 | Ishizuka et al. | 361/301.4 |
| 8,035,953 B2 * | 10/2011 | Nemoto et al. | 361/532 |
| 2009/0154068 A1 | 6/2009 | Choi et al. | 361/533 |
| 2010/0165547 A1 | 7/2010 | Kuranuki et al. | 361/525 |

OTHER PUBLICATIONS

Sang Min Lee PCT/US2011/052496, International Search Report and Written Opinion of the International Searching Authority, Apr. 25, 2012.

* cited by examiner

*Primary Examiner* — Nguyen T Ha
(74) *Attorney, Agent, or Firm* — Joseph T. Guy; Perkins Law Firm, LLC

(57) ABSTRACT

An improved solid electrolytic capacitor and method of forming a solid electrolytic capacitor is described. The method includes forming an anode comprising a valve metal or conductive oxide of a valve metal wherein an anode lead extension protrudes from the anode. A dielectric is formed on the anode and a cathode layer is formed on the dielectric. The anode, dielectric, and cathode layer are encased in a non-conducting material and the anode lead extension is exposed outside of the encasement at a side surface. A conductive metal layer is adhered to the anode lead extension which allows termination preferably by electrically connecting a preformed solid metal terminal, most preferably an L shaped terminal, to the conductive metal layer at the side surface.

11 Claims, 5 Drawing Sheets

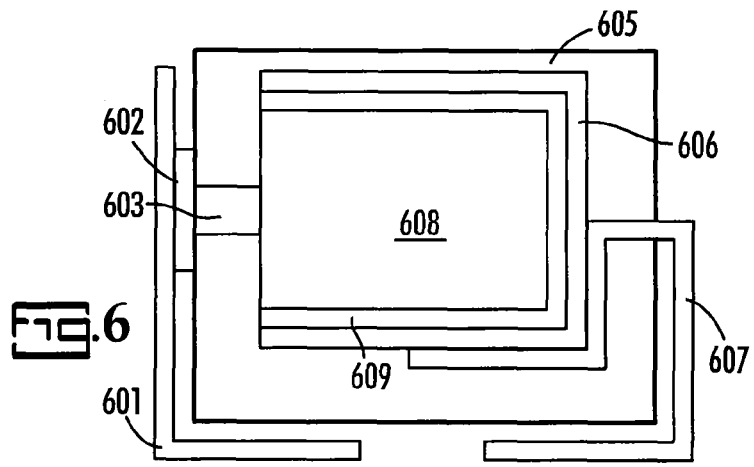
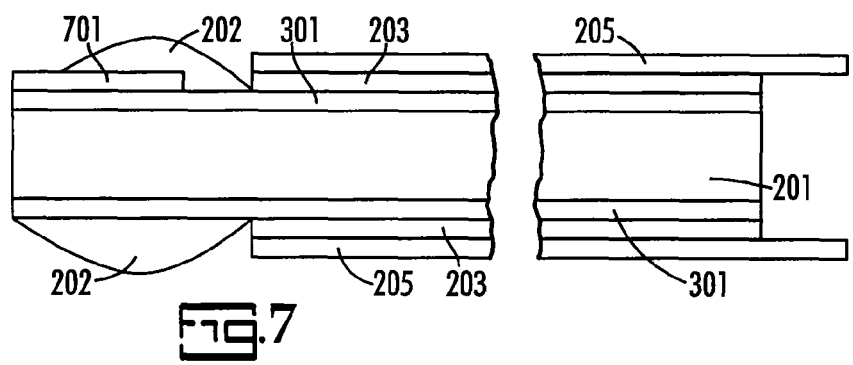
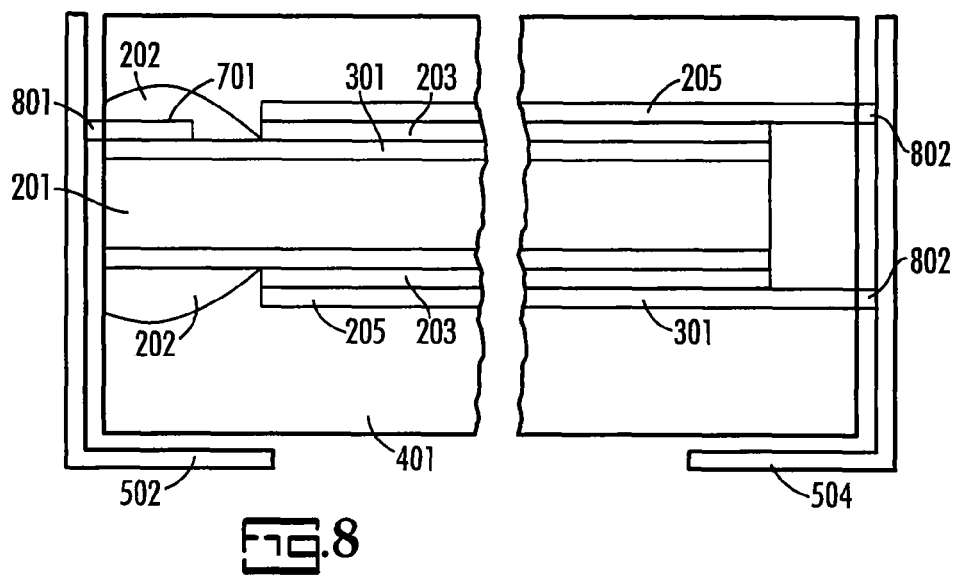

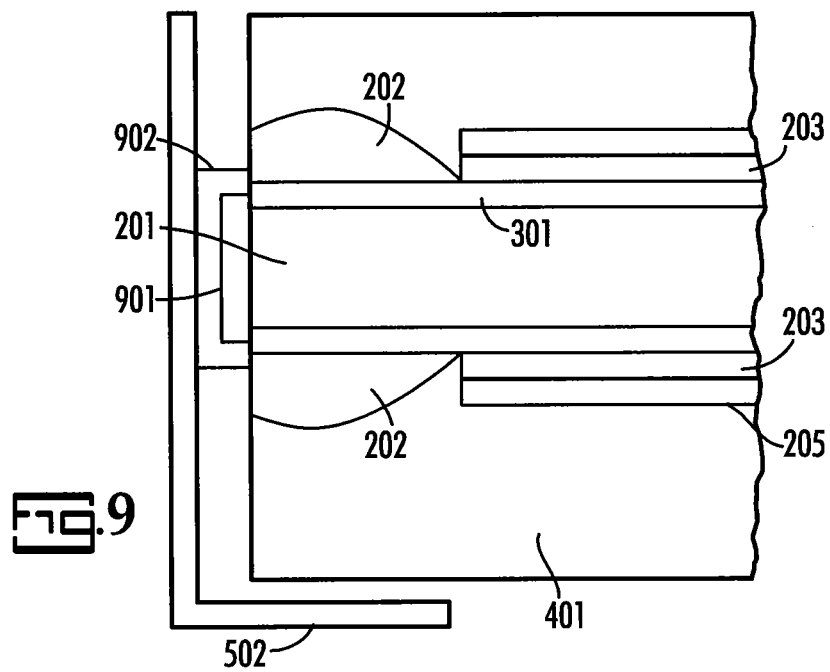
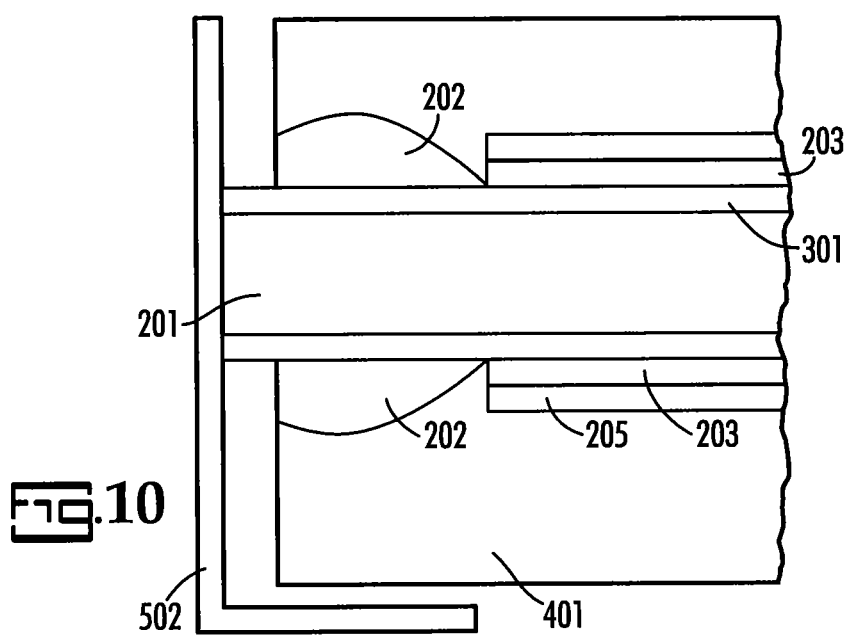

SOLID ELECTROLYTIC CAPACITOR AND METHOD OF MANUFACTURE

CROSS-REFERENCE TO RELATED APPLICATIONS

The present application claims priority to U.S. Provisional Patent Appl. No. 61/289,148 filed Dec. 22, 2009 and to U.S. Provisional Patent Appl. No. 61/384,785 filed Sep. 21, 2010 both of which are incorporated herein by reference.

BACKGROUND

The present invention is related to improvements in valve metal capacitors and an improved method of forming valve metal capacitors. More specifically, the present invention is related to methods for manufacturing valve metal capacitors which provides an improvement in volumetric efficiency while maintaining or improving electrical performance, more specifically equivalent series resistance, ESR.

It is standard practice in the manufacture of valve metal capacitors, particularly surface mount valve metal capacitors, to form a monolithic structure comprising an anode wire extending from the anode core wherein a dielectric and charge collecting cathode is on the surface of the monolith with a dielectric between the anode core and cathode. The manufacturing process includes attaching the anode wire to a lead frame at a first location and attaching the cathode to a lead frame at a second location.

FIG. 1a schematically illustrates a typical surface mount valve metal capacitor, 1, in cross-sectional view. In FIG. 1, the valve metal anode core, 2, has an anode wire, 3, extending there from. The anode wire is electrically connected to an anode lead, 4, typically by welding. A dielectric, 5, on at least a portion of the anode separates the anode from a cathode, 6. The cathode is electrically connected to a cathode lead, 7, by conductive adhesive, 11, and the entire structure, except for the contact portions of the anode lead and cathode lead, is encased in a non-conducting material, 8. The anode lead, 4, and cathode lead, 7, originates as a portion of a near-continuous lead frame in the form of an array, as is well documented in the art, with multiple anode leads and cathode leads integral to a common lead frame. The anode and cathode leads are electrically disconnected when capacitors are singulated such as by dicing.

In the case of aluminum based valve metal surface mount capacitors, it is standard practice to utilize aluminum in the form of foil for the anode, with roughened surfaces to increase surface area per unit volume, anodized to form a dielectric layer on the base material, and shaped into element(s) similar in size to the length and width of the overall device. The reason for employing aluminum in the form of relatively thin foil is that the preferred method to roughen the surfaces is only capable of reaching relatively shallow depths, so the most volumetrically efficient form is a thin sheet or foil. Each anodized element is processed to create a conductive polymer layer, acting as a primary cathode, over a portion of the anodized element thereby creating an active area of capacitance. Additional cathodic layers are added to protect the primary cathode, to collect the electrical current from the active area, and to conduct the electrical current to a leadframe extension that is located within the device encapsulant. Also within the encapsulant space, a portion of the anodic element is preserved without cathodic layers, serving as the anode extension, where this portion is attached to a separate leadframe extension. Both anode and cathode extensions of leadframe extend beyond the molded encapsulant and subsequently processed to form device leads which provide a means for the device to be soldered to printed circuit board mounting pads. The individual capacitive element is much thinner than the space allowed in typical industry standard surface mount capacitor package, thus additional capacitance is gained by stacking multiple individual capacitive elements on one another within the encapsulated device. Additional capacitive elements are stacked on top of the first element and attached to the first element by the same means as the first element is attached to the leadframe. The configuration of the first and/or subsequent elements may also be configured on the opposite side of the respective singular leadframe extensions.

FIG. 1B schematically illustrates a typical aluminum based surface mount valve metal capacitor, 100, in cross sectional view. In FIG. 1B, there are multiple capacitive elements, 101, that are constructed from an aluminum foil, 102, that has been processed to make its surfaces porous, 103. Over its entire surface, or just a portion of its surface, the porous aluminum foil is anodized to create a dielectric layer, 104. The foil is then processed to create a conductive polymer layer, 105, over the dielectric layer. A protective carbon layer, 106, is then applied over the conductive polymer layer, and a silver paint layer or metal filled organic resin layer, 107, is applied over the carbon layer to provide a capability to collect the electrical current from the capacitive region of the anode element. There is also a region, 108, of the anode element that is preserved from any of the capacitive associated layers, which acts as an anode extension and serves as the conductive path for the anodic electrical current. Thus deriving a complete capacitive element, 101. These capacitive elements are attached to a leadframe structure, 110, where the cathodic portion of the capacitive element is adhered to the cathodic portion of the leadframe, 111, with silver adhesive, 112, and the anode extension, 108, is attached to the anodic portion of the leadframe, 113, by welding. Additional capacitive elements are stacked on top of other capacitive elements and attached by the same methods as the first capacitive element(s) are to the leadframe extensions. This structure is then encapsulated in a thermosetting resin, 114. The leadframe extensions are processed to exist at the bottom surface of the encapsulant, 115, providing suitable mounting surfaces for soldering to a printed circuit board.

It is necessary for the anodic components and the cathodic components to be electrically separated as would be readily understood. This requirement creates a loss in volumetric efficiency since a significant volume of the ultimate capacitor does not contribute to capacitance. For example, with reference to FIG. 1, that portion of the capacitor surrounding the anode lead wire and anode lead provides no electrical purpose except to attach the lead frame to the lead wire with sufficient separation from the cathode layers. This problem is exacerbated by the necessity to provide enough separation between the active area of the capacitive element and the weld point, 9, in order to ensure that the effects of the weld operation, radiating unabated through the environment towards the sensitive and unprotected dielectric and cathodic layers, do not degrade the quality and performance of those layers. Shielding of the element from the weld process does not prove beneficial to reducing the occupied volume because practical limits of manufacturing precision prevent shortening of the distance required beyond that required without shielding. When multiple capacitive elements are combined into one capacitor the volumetric efficiency is even further eroded.

Yet another issue is the thickness of the current collecting cathodic layers which are typically some combination of conductive polymer layers and/or metal filled layers. These layers must have sufficient thickness to conduct a suitable amount of electrical current along the length and breadth of the capacitive element to the leadframe to achieve an acceptably low equivalent series resistance (ESR). In the case of solid electrolytic aluminum capacitors of typical construction containing stacked capacitive elements, the cathodic layers have the additional burden of carrying all of the electrical current for all capacitive layers stacked upon them away from the leadframe.

Electronic device manufacturers, who are the primary purchasers of surface mount capacitors, have a large installed manufacturing base tailored to mounting a surface mount capacitor onto a circuit board, or related element, to form an electrical sub assembly. Therefore, it is a necessity to provide capacitors which are structurally similar to surface mount capacitors as discussed above. Particular regards is necessary for the size, shape, and dimensions of the device and for the size, shape, and dimensions of the attachment locations. Unfortunately, the electronics industry is also constantly seeking to miniaturize electronic devices, or extract greater capacity and capability from the same size devices. This forces the manufacturer of components, such as capacitors, to seek more functionality in a given volume of space. These contradictory requirements have lead to the desire to provide a surface mount capacitor which has a higher volumetric efficiency or capacitance per unit volume while mimicking an industry standard surface mount capacitor in size and lead orientation. To address the loss in volumetric efficiency due to the anode attachment to its respective leadframe of typical valve metal capacitors, some manufacturers have attempted to locate the attachment outside of the device encapsulant. Some methods of connecting an anode extension to a preexisting external terminal, external to an encapsulant, have been proposed in U.S. Pat. Nos. 6,819,546 and 7,161,797. These methods involve forming a portion of the traditional leadframe material, or equivalent, embedded in the encapsulant, or as part of the overall encapsulating shell, and connecting the edge of the terminal to the exposed anode extension with a conductive layer applied onto the end of the device.

Other methods of similar construction are shown in US Application 2010/0165547. This application describes a device where the anode extension, and a portion of the applied conductive cathode, is exposed outside of the protective encapsulant. The end surfaces of the device from which the anode extension(s) and cathode layer is exposed are then flame sprayed, and subsequently made solderable, to create a terminal on each end of the device. This applied terminal material exists only on the end faces of the device, and does not have significant presence on the bottom, or surface mounting surface, of the device. It also covers the entire end faces of the device. This design represents a valve metal device with the terminal structure of an MLCC device. These terminal configurations are undesirable to customers, as these devices are not interchangeable with the industry standard termination specifications for valve metal capacitors. Further, these terminal configurations are undesirable to customers because the terminals extend the full width of the device. Per industry standard, the mounting pad on the printed circuit board is always more narrow than the device terminal due to the required stabilizing effect on the device during the soldering process of mounting the device to the PCB. Thus, when the terminal extends the full width of the device, the mounting pad on the printed circuit board is wider than the device, effectively requiring more space on the circuit board than can ever be filled by the capacitive device with this terminal configuration, resulting in less than ideal volumetric efficiency. Thus, a device that has terminals that are significantly narrower than the width of the device requires mounting pads on the printed circuit board that are narrower than the capacitive device, and thus requiring less space on the PCB, resulting in greater volumetric efficiency. It is preferred that a device would conform to the industry standard and preferably the device terminal would be 0.4 mm, or more, narrower than the device case. Typical construction methods of solid electrolytic valve metal capacitors as described here, which utilize a leadframe to terminate the device, meet such desirable terminal configuration as just described. Still further, terminal configurations in which the terminal reaches the top surface of the device, as those disclosed in U.S. Pat. Nos. 6,819,546 and 7,161,797, and US Application 2010/0165547, is also undesirable. This is due to a common condition of modern electronic devices exhibiting RF transmission, or those sensitive to external RF and EM interference, as in cellular telephones, where conductive metal grounded shielding is placed over the circuit board to mitigate such problems. In these devices, the shielding can come into contact with the top of the devices mounted to the PCB. Thus, devices with terminals reaching the top of the device would provide an electrical path between such terminals and the grounded shield, rendering the device and the circuit inoperable. Due to the conditions described above, it would be desirable to have a device that has improved volumetric efficiency potentially gained by externally attaching the anode extension to the terminal, while maintaining the exact terminal configuration of industry standard valve metal surface mount capacitors. Other reasons for providing a terminal with industry standard configuration are the customer's desire for rework of product. Many customers prefer that after the capacitor is soldered to the PCB a fillet of solder material is visible between the terminal and the pad. This allows for the device to be more easily removed if desired by the customer. As described in U.S. Pat. Nos. 6,819,546 and 7,161,797 the device end has a layer that provides connection from the anode to the terminal embedded in the encapsulate. Two potential problems arise from this in regards to the fore mentioned rework. One such problem is the careful attention needed to insure the connecting layer is solderable. Many described features may result in a surface that is not solderable, though is electrically connective. Another such problem related to rework is the mechanically integrity of the connective layer. If rework is needed the heat used to unmount the device may damage the connection layer and ultimately damage the device. It would be preferable to have a device with a terminal that is solid metal on all exposed surfaces so as to prevent damage to the device during rework processes and provide a continuous surface between the pad surface and end portions of the device to form a solder fillet.

Other methods of constructing surface mount solid electrolytic capacitors have been proposed such as those found in U.S. Pat. No. 6,185,091. These teachings still lead to volumetric inefficiencies. The focus is a construction with performance improvement related to its impact on an electrical circuit. The design requires the attachment of anode and cathode extensions. These teachings describe terminals that are mechanically attached prior to encapsulation. As described above this occupies space inside the encapsulation that lowers the volumetric efficiency of the device. In addition, no methods of attachment are taught in this patent and must be assumed to follow conventional methods of attachment that have no advantage in volumetric efficiency.

The volumetric efficiency of devices such as those disclosed in U.S. Pat. Nos. 6,819,546 and 7,161,797, and US Application 2010/0165547 is also severely limited due to the cathode layer construction which is specified as silver paste which is commonly used in the industry. There is a significant negative impact on volumetric efficiency by using silver paste as a current collecting cathode layer due to the relatively low conductivity of the paste, compared to solid metal conductor, which forces the use of a significant thickness of paste in order to conduct the necessary current to achieve the ESR performance expected of these products.

The present invention provides a capacitor which eliminates the problems in the art.

SUMMARY

It is an object of the invention to provide an improved capacitor.

A particular feature of the present invention is a capacitor, and method of manufacturing a capacitor, which has improved volumetric efficiency and maintained or improved electrical characteristics.

These and other advantages, as will be realized, are provided in a method of forming a solid electrolytic capacitor. The method includes forming an anode comprising a valve metal or conductive oxide of a valve metal wherein an anode lead extension protrudes from the anode. A dielectric is formed on the anode and a cathode layer is formed on the dielectric. The anode, dielectric, and cathode layer are encased in a non-conducting material and the anode lead extension is exposed outside of the encasement at a side surface. A conductive metal layer is adhered to the anode lead extension which allows termination preferably by electrically connecting a preformed solid metal terminal, most preferably an L shaped terminal, to the conductive metal layer at the side surface.

Yet another embodiment is provided in a method of forming a solid electrolytic capacitor. The method includes forming an anode of a valve metal, or conductive oxide of a valve metal, wherein a valve metal or conductive valve metal oxide anode lead extension protrudes from the anode. A dielectric is formed on the anode and a cathode layer is formed on the dielectric. The anode, dielectric, and cathode layer are encased in a non-conducting material thereby forming an encapsulant. The anode lead extension is exposed and a portion of the exposed valve metal anode lead extension is treated with zinc. A portion of the zinc is coated, preferably via electroplating or electroless plating, with a conductive metal and a preformed L shaped solid metal terminal is attached to the conductive metal.

Yet another embodiment is provided in a method of forming a solid electrolytic capacitor. The process includes forming an anode of a valve metal, or conductive oxide of a valve metal, wherein an anode lead extension of a valve metal or conductive oxide of a valve metal extends from the anode. A dielectric is formed on the anode and a cathode layer is formed on the dielectric. An anodic conductive material is applied to the anode lead extension. The anode, dielectric, and cathode layer are encapsulated in a non-conducting material and a portion of the anodic conductive material is exposed at a surface of the encapsulant. A preformed solid metal terminal is adhered to the anodic conductive material at the surface of said encapsulant.

Yet another embodiment is provided in a method for forming a capacitor. The method includes providing a plurality of capacitive elements wherein each capacitive element comprises a valve metal foil and an anode lead extension wherein each foil has an inactive region and an active region. The active region comprises a dielectric and a conductive layer on the dielectric. The capacitive elements are interleaved with solid metal current collectors. Each solid metal current collector is adhered to at least one conductive layer using a conductive adhesive thereby forming an active capacitive stack. The active capacitive stack is encased and each anode lead extension is exposed on a first face and said solid metal current collector is exposed on a second face of the encasement. A portion of each exposed anode lead extension with is treated with zinc and a conductive metal is adhered to the zinc, preferably, via a method selected from electroplating or electroless plating. A preformed metal cathode terminal is adhered to the exposed solid metal current collectors; and a preformed metal anode terminal is adhered to the conductive metal.

Yet another embodiment is provided in a method for forming a capacitor. The method includes providing a plurality of capacitive elements wherein each capacitive element has a valve metal foil and an anode lead extension and each foil has an inactive region and an active region with the active region comprising a dielectric and a conductive layer on the dielectric. An anodic conductive material is attached to each valve metal foil at the inactive region. The capacitive elements are interleaved with solid metal current collectors. Each solid metal current collector is adhered to at least one conductive layer using a conductive adhesive thereby forming an active capacitive stack. An encasement of non-conducting material is formed with the active capacitive stack in the encasement. The anode conductive material is exposed on a first face and the solid metal current collectors is exposed on a second face. A preformed solid metal cathode terminal is attached to the exposed solid metal current collectors. A preformed solid metal anode terminal is attached to each the anodic conductive material.

Yet another embodiment is provided in a method for forming a capacitor. The method includes providing a plurality of capacitive elements wherein each capacitive element has a valve metal foil and an anode lead extension. Each foil has an inactive region and an active region comprising a dielectric and a conductive layer on the dielectric. The capacitive elements are interleaved with solid metal current collectors and the solid metal current collectors are adhered to at least one conductive layer using a conductive adhesive thereby forming an active capacitive stack. An encasement of a non-conducting material is formed with the active capacitive stack in the encasement. Each anode lead extension is exposed on a first face thereby forming exposed anode lead extensions and the solid metal current collectors are exposed on a second face. A conductive metal is adhered to the exposed anode lead extensions and a preformed metal cathode terminal is adhered to the exposed solid metal current collectors. A preformed metal anode terminal is adhered to the conductive metal.

Yet another embodiment is provided in a solid electrolytic capacitor. The capacitor has at least one capacitive element comprising a valve metal anode body with an anode lead extension extending there from. A dielectric layer is on a surface of the anode body and a cathode layer is on the dielectric layer. At least one solid metal current collector is adhered to the cathode layer with conductive adhesive. At least one anodic conductive material is bonded to the anode lead extension. An encapsulant encases the capacitive element and the solid metal current collector except for a portion of the anode lead extension, the anodic conductive material, and the solid metal current collector which are exposed outside the encapsulant. A preformed solid metal anodic terminal is electrically connected to, and on a same surface as, the anodic conductive material. A preformed solid metal cathodic terminal electrically is connected to, and on a same surface as, the exposed solid metal current collector.

Yet another embodiment is provided in a solid electrolytic capacitor. The capacitor has at least one capacitive element comprising a valve metal anode body with an anode lead extending there from. A dielectric layer is on the surface of the anode body and a cathode layer is on the dielectric layer. At least one solid metal current collector is adhered to the cathode layer with conductive adhesive. An encapsulant encases the capacitive element and the solid metal current collector except for a portion of the anode lead extension and the solid metal current collector that are exposed outside the encapsulant. A preformed solid metal anodic terminal is welded to, and on a same surface as, the anodic conductive material. A preformed solid metal cathodic terminal is electrically connected to, and on a same surface as, the exposed solid metal current collector.

Yet another embodiment is provided in a solid electrolytic capacitor. The capacitor has at least one capacitive element wherein each capacitive element comprises a valve metal anode body with an anode lead extending there from, a dielectric layer on the surface of the anode body and a cathode layer on the dielectric layer. At least one solid metal current collector is adhered to the cathode layer with conductive adhesive. An encapsulant encases the capacitive element and the solid metal current collector except for a portion of the anode lead extension and the solid metal current collector that are exposed outside the encapsulant. An intermediate conductive bonding layer is applied on the exposed surface of the anode lead extension. A preformed solid metal anodic terminal is electrically connected to, and on a common surface with, the intermediate conductive bonding layer. A preformed solid metal cathodic terminal is electrically connected to, and on a common surface with, the exposed solid metal current collector.

Yet another embodiment is provided in a solid electrolytic capacitor. The capacitor has at least one capacitive element comprising a valve metal anode body with an anode lead extending therefrom, a dielectric layer on a surface of the anode body and a cathode layer on the dielectric layer. An encapsulant encases the capacitive element except for a portion of the anode lead extension that is exposed outside the encapsulant. An intermediate conductive bonding layer is applied to the exposed surface of the anode lead extension. A preformed solid metal anodic terminal is electrically connected to, and on a same surface as, the intermediate conductive bonding layer.

Yet another embodiment is provided in an improved solid electrolytic capacitor. The capacitor has at least one capacitive element comprising a valve metal anode body with an anode lead extending therefrom. A dielectric layer is on a surface of the anode body and a cathode layer is on the dielectric layer. At least one anodic conductive material bonded to the anode lead extension. An encapsulant encases the capacitive element except for a portion of the anode conductive material that is exposed outside the encapsulant. A preformed solid metal anodic terminal is electrically connected to, and on a same surface as, the anodic conductive material.

Yet another embodiment is provided in an improved solid electrolytic capacitor. The capacitor comprises at least one capacitive element comprising a valve metal anode body with an anode lead extending there from. A dielectric layer is on a surface of the anode body. A cathode layer is on the dielectric layer. An encapsulant encases the capacitive element except for a portion of the anode lead extension that is exposed outside the encapsulant. A preformed solid metal anodic terminal is welded to, and on a same surface as, the anodic conductive material.

Yet another embodiment is provided in a method of forming a solid electrolytic capacitor. The method includes forming an anode of a valve metal or conductive oxide of a valve metal wherein an anode lead extension of a valve metal or conductive oxide of a valve metal extends from the anode. A dielectric is formed on the anode and a cathode layer is formed on the dielectric. The anode, dielectric, and cathode layers are encased in a non-conducting material thereby forming an encapsulant. A portion of the anode lead extension is exposed at a surface of the encapsulant. A preformed solid metal terminal is in electrical contact with the anodic conductive material at the surface of the encapsulant.

Yet another embodiment is provided in a method for forming a capacitor. The method includes providing a plurality of capacitive elements wherein each capacitive element comprises a valve metal foil and an anode lead extension and wherein each foil has an inactive region and an active region comprising a dielectric and a conductive layer on the dielectric. The capacitive elements are interleaved with solid metal current collectors and each solid metal current collector is adhered to at least one conductive layer using a conductive adhesive thereby forming an active capacitive stack. An encasement of non-conducting material is formed on the active capacitive stack forming an encasement. The anode lead extension is exposed on a first face and the solid metal current collectors are exposed on a second face. A preformed solid metal cathode terminal is adhered to the exposed solid metal current collectors and a preformed solid metal anode terminal is attached to each anode lead extension.

BRIEF DESCRIPTION OF FIGURES

FIG. 6 is a cross-sectional schematic view of an embodiment of the invention with terminals.

FIG. 7 is a cross-sectional view of an embodiment of a termination design employing the anodic conductive material attached to the anode.

FIG. 8 is a cross-sectional view of an embodiment of a termination design employing the anodic conductive material attached to the anode, with terminal attached FIG. 9 is a cross-sectional view of an embodiment of a termination design employing the nickel on the anode extension, with terminal attached.

FIG. 10 is a cross-sectional view of an embodiment of a termination design employing the ultrasonic direct connection, with terminal attached.

DETAILED DESCRIPTION

Figure 1A:
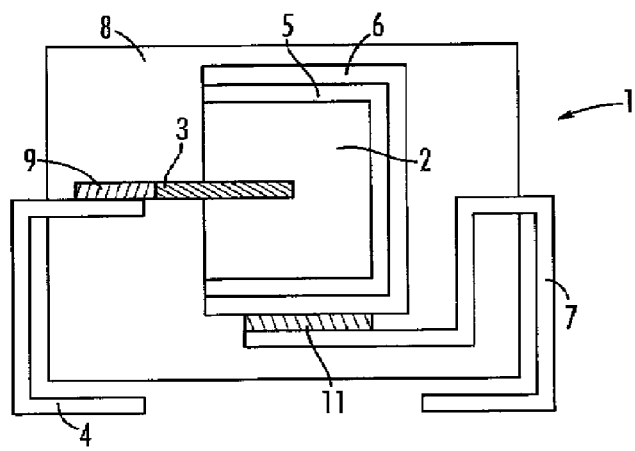
FIG. 1a is a cross-sectional schematic view of a prior art capacitor
Figure 1B:
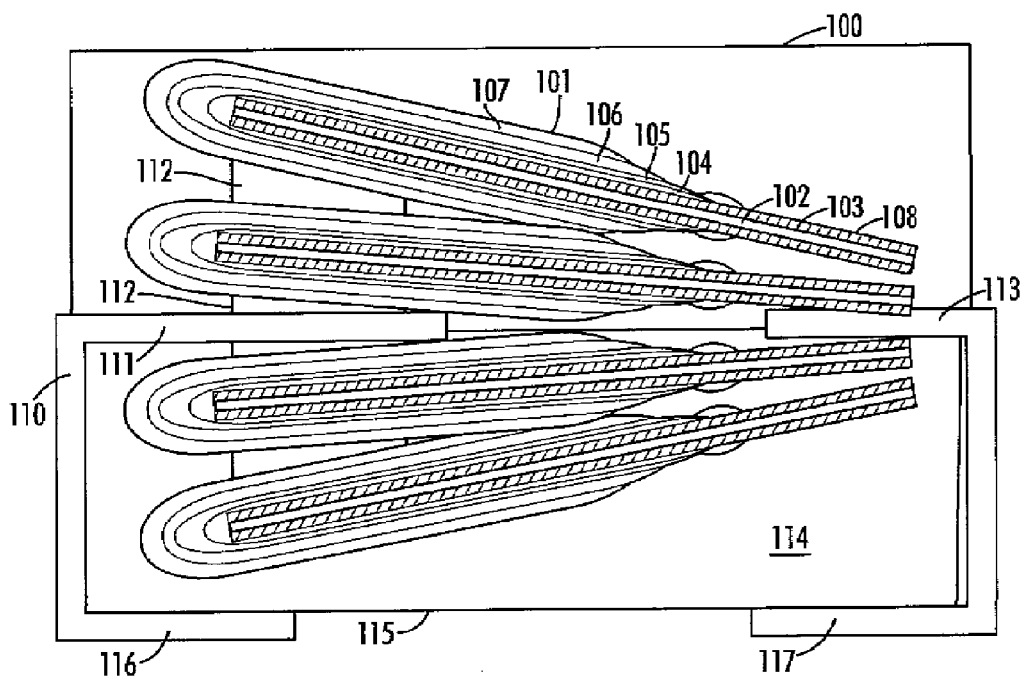
FIG. 1b is a cross-sectional schematic view of a prior art capacitor

The present invention is related to an improved capacitor and a method of manufacturing an improved capacitor.

The present invention introduces a device construction by which the volume occupied by the attachment of the anode portion of the capacitive elements to the terminal is significantly reduced thereby increasing volumetric efficiency.

Similarly, the present invention introduces a method by which the thickness of the current collecting cathode layers can be significantly reduced which also increases volumetric efficiency. Both aspects provide the ability to increase the size of the capacitive region of the element(s) and/or increase the count of capacitive elements within the same overall volume of the device while also maintaining or improving electrical performance.

A capacitor device made from a valve metal foil. Where the valve metal foil, herein referred to as anode foil, has a roughened surface, so as to increase the surface area of the metal. A dielectric formed on the surface of the roughened metal, formed by anodization of the metal. A conductive polymer layer is applied to the surface of the dielectric such as to make contact to the internal surface of the roughened area and to provide a physical barrier layer between the dielectric and subsequence layers. A carbon paint layer is applied to the polymer layer to facilitate adhesion to the polymer layer. A solid metal current collecting layer is applied to the face of each element and adhered to the face by a metal filled adhesive, preferably silver. The solid metal current collector preferably overlaps at least, but not limited to, 70% of the adjacent cathode layer, more preferably the solid metal current collector overlaps at least 80% of the adjacent cathode layer and most preferably at least 90%. The solid metal current collector is preferably adhered over the entire overlapping region between the conductive cathode layers and the solid metal current collector. A plurality of layers are constructed and encapsulated. The anode foil is exposed on the outer surface of the encapsulant and the solid metal current collecting layer is exposed on an opposing surface of the encapsulant. The anode foils and solid metal current collector are attached to external terminals. A surface treatment application is used to prepare the anode foils or solid metal current collector such that they can be attached to external terminals.

Constructing in this way allows for improvements or reduction in the volume of space utilized in the capacitor device associated with connecting the anode extension to the device terminal. This is done by the encapsulation around the anode extensions providing protection for the capacitive portion of the element(s) from the process of attaching the terminal. Once the anode extension is exposed outside of the encapsulant it expands the availability of methods that can be used to make the attachment. This is counterintuitive as conventional methods of attachment may become more difficult to perform, requiring new methods to facilitate the connection. This protection of the capacitive portion of the element allows for the connection to be made closer to the capacitive portion, without damaging or affecting this portion negatively, thereby improving volumetric efficiency of this device over existing process. An advantage of the present invention is the ability to prepare an anode extension in such a way as to allow the terminal to be directly attached to the exposed extension, thereby enabling the utilization of a terminal design that conforms to industry standards for solid electrolytic surface mount capacitors.

Further volumetric efficiency and electrical parameters are provided in one embodiment by incorporation of the solid metal current collector(s) replacing the cathodic silver paint known in prior art. The use of solid metal current collectors is made practical by application of the terminal attachment method disclosed herein, that directly attaches the solid metal current collectors to the device terminal outside of the device encapsulant. Similar to the anode extension terminal attachment method, the encapsulant provides protection to the capacitive portion of the element(s). Once the solid metal current collector is exposed outside of the encapsulant it expands the availability of methods that can be used to make the attachment. The protection of the capacitive portion of the element by the encapsulant also allows for the connection to be made closer to the capacitive portion, without damaging or affecting this portion negatively, thereby improving volumetric efficiency of this device over existing process. With this solid metal current collector in place of the typical metal filled polymer, the current collecting layer can now be much thinner due to the increased conductivity of the solid metal layer in comparison to the metal filled polymer without compromising electrical performance. The thinner layer provides more available volume inside the capacitor device that can be used by active capacitance portions, increasing volumetric efficiency. Typical material thicknesses used for the solid metal current collector results in a conductive path with lower resistance in relation to the typical metal filled polymer layer, thereby improving electrical performance. The resistance is lowered further due to the path length from the capacitance region of the element(s) to the external terminal no longer passing through the metal filled polymer from element to element, but is conducted directly from each individual current collector to the device terminal. The combination of the current collectors and the terminal attachment method allows for the improvement in volumetric efficiency and improved electrical parameters.

The present invention discloses a device construction where the anode extension of the capacitive element(s) is encased by the encapsulant, or equivalent, and exposed outside of the encapsulant. The terminal of the device is then attached to the exposed anode extension(s) of the capacitive element(s). The encasing of the anode extension(s) by the encapsulant, or equivalent, thereby protects the capacitive region of the element from the process and effects of the attachment method chosen. Thereby also increasing the number of practical methods of attaching the anode extensions to the terminal to be chosen from.

Further, encasing of the anode extension(s) in encapsulant, and exposing the anode extension outside, or on the surface of, the encapsulant, provides the capability of defining the exposed portion of the anode extension, to which the terminal will be attached, to be only that of its cross sectional area, which is much smaller than the practical space required for conventional attachment. The attachment of the anode extensions to the terminal can now also be conducted in a plane that is perpendicular to the primary plane of the elements. Thus, the new methods available for attaching the anode extensions to the terminal occupy far less volume than that experienced by typical methods of construction.

The present invention also discloses a device construction where the current collecting cathode layer consists of a solid metal conductor which can be much thinner than the relatively thick current collecting cathode layer of that used in typical construction, while achieving the same ESR performance. This is due to the fact that a solid metal current collector has approximately 10-1000 times the conductivity of the typical conductive "paint" used as the current collecting cathode layer in typical device construction. Further, each of the solid metal current collectors is exposed outside the encapsulant for independent and direct connection to the device terminal which is a significant advantage over the prior art wherein This configuration provides a higher conductivity connection between the element cathode layers and the device terminal. Prior art requires the current to be passed through the lower conductivity cathode layer of each element residing between the subsequent elements and the leadframe. This current path from element to element incurs a series of resistances that increase the overall resistance of the device.

By lowering and distributing this resistance in parallel, as provided in an embodiment, the overall device resistance is lowered.

Similar to the connection of the anode extensions to their terminal, the connection of the solid metal current collectors to their terminal can be selected from a number of volumetrically efficient methods.

The invention will be described with reference to the figures which form an integral, non-limiting, component of the disclosure. Throughout the description similar elements will be numbered accordingly.

The present invention is related to capacitors comprising valve metal anodes or anodes with conductive oxides of valve metals. Particularly preferred anodes materials are materials that form an anodic oxide layer that acts as a capacitive dielectric or allow for the application of a dielectric material on the surface, the material is preferably selected from the group consisting of Al, W, Ta, Nb, Ti, Zr, Hf and conductive oxides thereof. More preferably the anode comprises a material selected from the group consisting of Al, Nb, Ta and NbO. In the case of aluminum anode material, the thickness of the anode is preferably 10-500 microns thick. More preferably, the anode is 100-360 microns thick. Below about 10 microns thick the foil becomes difficult to handle on a manufacturing scale. Above about 500 microns thick the ESR performance is negatively impacted.

Figure 2:
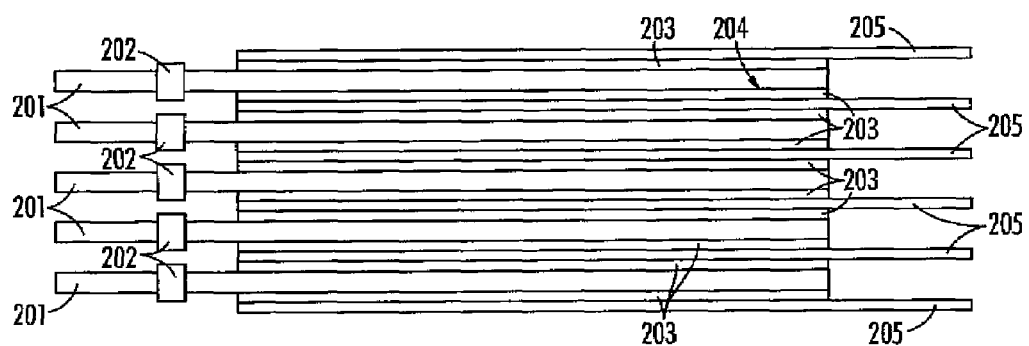
FIG. 2 is a partial cross-sectional schematic view of an embodiment of the invention prior to encapsulation.

FIG. 2. Illustrates a schematic view of the embodiment of the present invention, comprising anode foil, 201, a masking material, 202, conductive cathode layers, 203, solid metal current collector, 205. A detailed view of the conductive cathode layers, anode foil and solid metal current collector, 204, is further illustrated in detail in FIG. 3.

Figure 3:
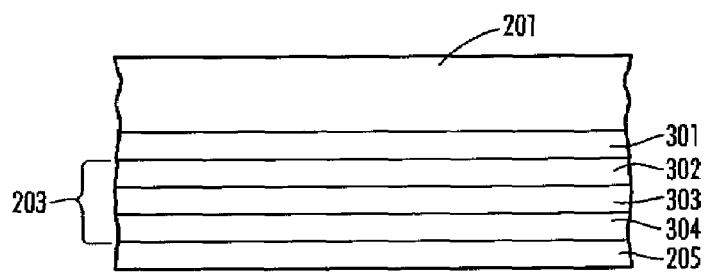
FIG. 3 is a detailed exploded schematic view of an embodiment of the invention of FIG. 2.

A partial cutaway cross-sectional view taken from portion 204 of FIG. 2 is illustrated in FIG. 3 wherein the details of the preferred layers between the anode foil, 201, and solid metal current collector, 205, are illustrated. In FIG. 3, the dielectric, 301, is on the anode and preferably formed by chemical anodization of the anode. A conductive layer, 302, preferably comprising a conductive polymer, is on the dielectric. A carbon layer, 303, provides a surface which is more easily adhered to than the conductive layer. A conductive adhesive, 304, adheres the solid metal current collector to the carbon layer.

Figure 4:
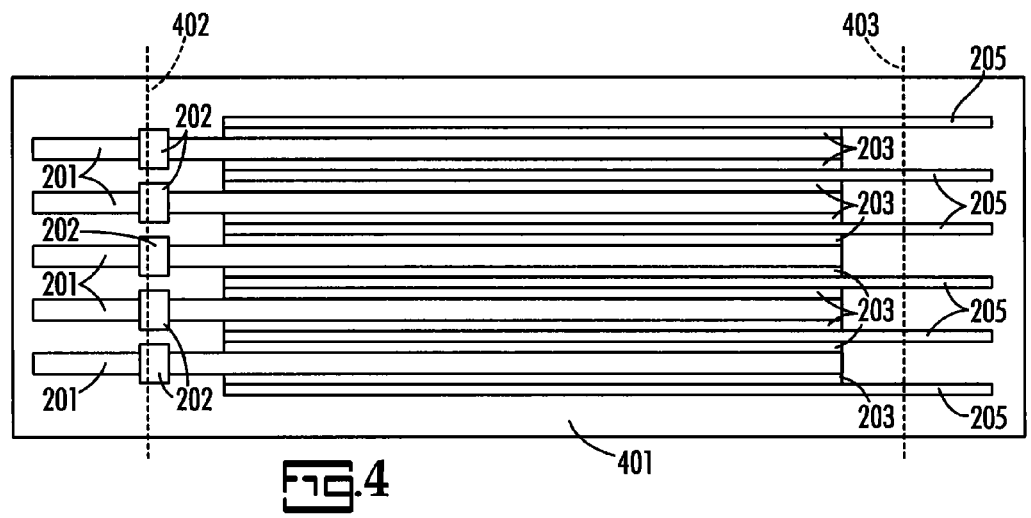
FIG. 4 is a cross-sectional schematic view of an embodiment of the invention after encapsulation.

FIG. 4 illustrates a schematic cross-sectional view of the layered structure of FIG. 2 after encapsulating and prior to dice cutting or exposure. In FIG. 4, each anode, 201, has a dielectric on either side which is integral to the anode and not illustrated separately. A conductive layer, 203, is on either side of the dielectric and the overlapped anode and conductive layer form the active capacitor. Interleaved solid metal current collectors, 205, act as charge collectors with internal solid metal current collectors, 205, collecting charge from cathode layers on either side, and the two outside solid metal current collectors, 205, collecting charge from a single cathode layer. A non-conductive polymer, 401. The assembly is then dice cut on the anodic side at 402 and on the cathodic side at 403. The conductive layer preferably comprises a conductive polymer, 302, with a carbon coating, 303, thereon. A conductive adhesive, 304, and most preferably a silver filled adhesive is between the solid metal current collector, 205, and the carbon layer, 302.

Figure 5:
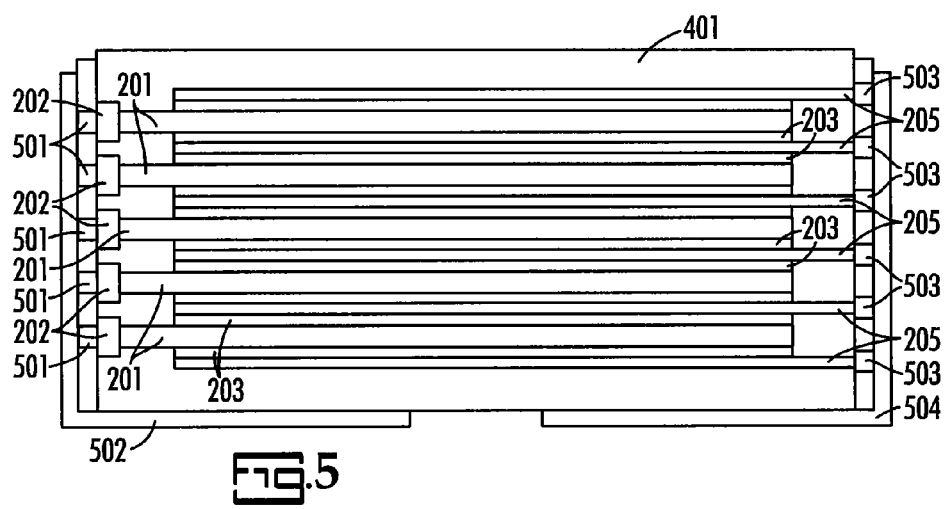
FIG. 5 is a cross-sectional schematic view of an embodiment of the invention with terminals.

FIG. 5 illustrates an embodiment of FIG. 4 in schematic cross-sectional view after dice cutting and termination. In FIG. 5, anode termination layer, 501, and cathode termination layer, 503, are formed as will be described further herein, as illustrated in FIG. 7-10. As part of these figures intermediate conductive layer, 501 and 503, are representative of some embodiments. Anode terminal, 502, is attached to the anode termination and cathode terminal, 504, is attached to cathode termination layer.

FIG. 6 illustrates an embodiment of the invention. An anode body, 608, is a high surface area valve metal structure, preferably, but not limited to, tantalum. A dielectric layer, 609, is an oxide formed on the anode body, 608, by anodization. Conductive layers, 606, are formed on the dielectric surface and are electrically connected to cathode terminal, 607. Conductive layers preferably include, but are not limited, a conductive polymer layer, a carbon paint, a silver paint, and silver adhesive. Integral to the anode body, 608, is an anode extension, 603. The anode extension, 603, is exposed outside of the device encapsulation, 605. The attachment of anode terminal, 601, is by methods illustrated in FIG. 7-10. As part of these figures intermediate conductive layer, 602, is representative of some embodiments.

An embodiment of the invention will be described with reference to FIG. 7. In FIG. 7, the anode, 201, is in the form of a sheet or foil of a valve metal or conductive oxide of a valve metal. A dielectric, 301, is on the surface of the anode and may be over the entire surface or both surfaces of the anode. The dielectric is preferably, but not limited to, an oxide of the anode material due to the manufacturing efficiencies provided thereby. A cathode layer, 203, is formed on the dielectric layer, 301. An anodic conductive material, 701, is electrically connected to the anode, 201, and extends beyond a mask, 202. The layered structure is then eventually dice cut at 402. Multiple capacitive elements would then be stacked with solid metal current collectors, 205, interleaved between adjacent cathode layers, 203.

A partial layered arrangement is illustrated in FIG. 8 wherein an anode terminal, 502, is in electrical contact with the anodic conductive material, 701. Anode terminal, 502, is connected to the anodic conductive material, 701, via bond layer, 801, which is preferably, but not limited to, a solder. Cathode terminal, 504, is connected to the solid metal current collector, 205, via bond layer, 802, which is preferably, but not limited to, a solder. Subsequent layers are not shown.

An embodiment of the invention is illustrated in FIG. 9. Intermediate conductive layer, 901, is electrically connected to anode, 201. The intermediate conductive layer, 901, is preferably, but not limited to, a nickel plated layer, metal flame spray, metal arc spray, metal sputtering, chemical vapor deposition, or powder metal sintering. Anode terminal, 502, is bonded to intermediate conductive layer, 901, via bond layer, 902, which is preferably, but not limited, as solder.

An embodiment of the invention is illustrated in FIG. 10. Anode terminal, 502, is bonded directly to anode, 201, preferably, but not limited to, by ultrasonic welding, resistance welding, laser welding, or melting.

One of the challenges of terminating valve metal capacitors is the presence of the resistive air oxide that forms on the metal which is electrically resistive. This makes attaching the anode terminal to the anode extension difficult. Processes that are capable of making this connection in the presence of the air oxide require large amounts of heat and energy to melt the anode extension. This may be difficult or undesirable with the exposed anode extension, due to the potential to damage the capacitive element. To alleviate this problem an intermediate conductive bonding layer is applied to the anode extensions. This intermediate conductive layer can be applied so that there is low interfacial resistance between the said layer and the anode extensions, by removing or reducing the air oxide and its electrical impact, without introducing the undesirable heat and energy problems of conventional attachment methods. In addition this intermediate bond layer does not form a problematic air oxide layer, such as the valve metal. This intermediate conductive bonding layer enables processes that are more desirable to be used to bond the anode terminal to the anode extensions. These processes may include, but are not limited to, soldering, brazing, conductive adhesive bonding, nano foil bonding, ultrasonic welding, laser welding, resistance welding, low temperature sintering, welding, or electrically adhesive, or any method that electrically or mechanically connects the intermediate layer to the terminal.

Nickel plating the anode extension of a valve metal is challenging, particularly with an aluminum and tantalum anode, due to air oxide formation on the exposed surfaces. The edge of the aluminum which is exposed during dice cutting is treated with a zincate process. The zinc displaces surface aluminum thereby forming a zinc coating on the aluminum. The zinc layer is a protective coating that promotes plating of metals, such as nickel, on the substrate and may or may not be incorporated in the final plating layer. The zinc coating is then replaced with nickel through a standard plating process, either electroless or electroplated nickel. This process is applicable to embodiments that employ nickel plating the anode extension. In another embodiment the anode terminal is attached by ultrasonic welding. The terminal is brought into a compressive relationship with the exposed anode extension and an ultrasonic pulse is applied to the terminal. The friction caused by the pulse fuses the terminal and anode extension thereby making permanent electrical connection between the terminal and the anode extension. Though ultrasonic is a preferred method due to the benign conditions associate with this weld process, due to the above mentioned improvements in protection of the active capacitive element, additional methods can be used to facilitate the attachment of the terminal. Methods as such may include, but not limited to, resistance welding, laser welding, or any method that produces a high temperature, in the joint between the terminal and the extensions, in order to fuse or melt the features together.

In contrast to methods of forming the intermediate conductive bonding layer, which in one embodiment is a conductive metal layer, an additional method of preparing the anode extension for terminal attachment is herein described. The method involves bonding, electrically and/or mechanically, a feature, herein called anodic conductive material, to the anode extension, prior to encapsulation that will later facilitate the attachment of the terminal. This anodic conductive material is then partially exposed along with the anode extension. Some methods of this facilitation include the ability to solder to the anodic conductive material or with the anodic conductive material providing support for other processes such as welding processes. With prior art teachings, all anodes extensions are connected immediately prior to encapsulation at the stacking step. This has less flexibility relative to the inventive teachings herein in that the tolerances of stacking multiple elements are removed in the inventive teachings herein. Bonding an individual element as described herein allows for more precise placement and therefore better control in reducing volumetric impact.

The anodic conductive material and solid metal current collector are preferably copper, with nickel or any other solderable material, being suitable for demonstration of the invention. The anodic conductive material and solid metal current collector are preferably 1-100 microns thick and more preferably 5-20 microns thick. Below about 5 microns the foil becomes difficult to handle on a manufacturing scale. Above about 100 microns the foil decreases volumetric efficiency.

An embodiment of the current invention includes a terminal that exists on both the bottom, i.e. surface mounting surface, and the end surface of the device from which the anode extension is exposed. The connection between the anode extension and terminal is independent of the encapsulant. This removes the need to create a conductive layer with sufficient mechanical adhesion and integrity, and electrical conductivity, along the exposed portions, including the extension and surrounding encapsulant, of the device to direct the current from the terminal embedded on an adjacent side of the device to the exposed anode extension, as required in U.S. Pat. Nos. 6,819,546 and 7,161,797. The adhesion to the encapsulant is the critical aspect and the most difficult to insure.

An embodiment of the current invention includes an adhesive between the terminals and the encapsulant. The use of this adhesive improves the mechanical reliability of the invention. The adhesive can be applied at any point of the construction and does not interfere with the electrical connection between the terminal and the anode extension or solid metal current collector. The adhesive can be, but is not limited to, a nonconductive adhesive or the encapsulant material. Part of the terminal may also be embedded in the encapsulant.

An embodiment of this invention is the unique use of solid metal current collectors as the cathode current collector for each capacitive element, which may be applied singularly between each of a plurality of capacitive elements, and to leave these solid metal current collectors exposed outside the capacitor encapsulant. The cathode solid metal current collectors extends in at least one direction beyond the anode foil layers, and the anode foil layers extend in at least one direction beyond the cathode solid metal current collectors.

Embodiments of the present invention use the cathode solid metal current collectors between a plurality of elements which allows for the removal of the conductive metal filled organic resin layer on each capacitive element. This conductive resin layer that has been removed in this invention is critical to the manufacture of conventional surface mount valve metal solid electrolytic capacitors. This differs from the conventional application of current collecting layers. One convention is the traditional leadframe in which the adjacent capacitive element(s) are conductively adhered to a solid metal leadframe that also acts as the terminal attachment of the device. This requires the subsequent capacitive element(s) to have a series of conductive layers of a metal filled paint acting as current collectors, resulting in higher ESR due to lower relative conductivity. The second convention is the use of the cathode foils in a device that uses a porous insulator material to separate the anode and cathode foils. In these designs conductive polymer or liquid electrolytes are used to fill the space between the anode and cathode foils and make connection between the capacitive element(s) and cathode foil(s). Also in this convention is the replacement of all cathode layers except for the conductive polymer with that of the cathode foils. This comes at sacrifice to the ESR of the device, or increased cost and complexity as process must be added to the cathode foil to promote mechanical and electrical adhesion to the polymer. An additional disadvantage is presented in the ability for these designs to utilize a maximum amount of capacitance of the high surface area structure. The problems related to covering the entire dielectric surface with polymer are well known in the industry. By applying the cathode foils to the anode foils prior to polymerization some of the ability to impregnate the anode foil is lost. Processing the anode prior to assembling any additional layers allows for maximum amount of polymer coverage of the dielectric surface, as is currently done in practice.

In conventional construction of surface mount valve metal solid electrolytic capacitors, the highly conductive metal filled organic resin outer layer, silver paint layer, of the capacitor element takes up a significant amount of space in the capacitor. In order to achieve improved volumetric efficiency this layer is traditionally thinned to allow more volume available for capacitance. This thinning though has a detrimental impact on the ESR of the final device. Because this layer is a metal filled organic resin, the conductivity is 10-1000 times lower than that of pure metal. An embodiment of the current invention allows for a solid metal current collecting cathode layer, on the order of the same desired thickness of the metal filled organic resin layer, to replace this traditional metal filled organic resin layer with significantly improved resistance and may also be thinned further to realize additional volumetric efficiency gains without negatively impacting the ESR. The same conductive adhesive, that normally connects each capacitive element to each other or the leadframe, now connects the solid metal current collectors to the capacitor element without the metal filled organic resin layer.

In an embodiment of the invention, the cathode solid metal current collectors are directly connected, externally, to the device terminal. This significantly improves the overall ESR of the device due to the direct metal connection of the current collector along every face of the capacitive element(s); where traditional designs rely on the conductivity of the metal filled organic resin layer and its corresponding adhesive layer to connect a plurality of capacitive elements to each other and finally to the terminal of the device. So, in traditional device designs, with these layers not having the conductivity of a solid metal, the ESR is higher than the proposed design.

The conductive layer acting as the cathode layer preferably comprises conductive polymer, such as polythiophene, polyaniline, polypyrrole or their derivatives; manganese dioxide, lead oxide or combinations thereof. An intrinsically conducting polymer is most preferred.

A particularly preferred conducting polymer is illustrated in Formula I:

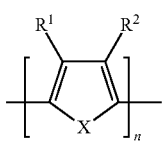

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—(CH$_2$)$_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$alkylbenzyl, $C_1$-$C_4$alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

The carbon layer comprises a conductive composition comprising resin and conductive carbon particles. The carbon layer may further comprise adjuvants such as crosslinking additives, surfactants and dispersing agents. The resin, conductive carbon particles and adjuvants are preferably dispersed in an organic solvent or water to form a coating solution. The solvent and resin for the conductive carbon layer needs to have good wettability to the semi-conductive cathode surface.

The cathode conductive layer (silver paint or metal filled organic resin layer) preferably comprises a conductive composition comprising resin and conductive silver particles. The silver layer may further comprise adjuvants such as crosslinking additives, surfactants and dispersing agents. The resin, conductive silver particles and adjuvants are preferably dispersed in an organic solvent or water to form a coating solution. The solvent and resin for the conductive carbon layer needs to have good wettability to the carbon surface.

Conductive adhesive is typically used in the embodiments to adhesively attach the cathode layer, and preferably the carbon layer of the cathode layer, to the solid metal current collector. The conductive adhesive may be any layer used to bind layers electrically and mechanically and is preferably a metal filled polymer, more preferably silver filled polymer. The conductive adhesive layer may also be, but not limited to, a carbon paste or an asymmetrically conductive film. Conductive adhesive cure conditions are appropriately modified to get electrical conduction through the conductive adhesive layer.

In an embodiment of the invention a capacitive element would be prepared by etching Al foil, anodized to form a dielectric, adding a polymer cathode layer, a carbon cathode layer and a conductive adhesive layer. A capacitive stack would be prepared from a plurality of capacitive elements interleaved with solid metal current collector plates wherein the capacitive elements and solid metal current collector plates extend beyond one another. The capacitive stack would optionally, and preferably, be encapsulated in a thermosetting resin. The encapsulated capacitive stack would be saw diced to reveal anode extensions of capacitive elements, and extensions of solid metal current collector plates. In another embodiment the anode end of the device would be treated in a manner to prepare the exposed aluminum foils for nickel plating layer, such as by zincating, or Al oxide removal and nickel plated while in oxygen free environment. Nickel would be plated on to the anode foils exposed from the end of the device. At each end of the device an "L" shaped terminal would be applied which preferably wraps around to the bottom, surface mounting, face of the device. Terminals would be soldered to respective electrical members, nickel plated anode extensions and solid metal current collecting plates. The legs of the terminals located on the bottom of the device would be adhered to the encapsulant surface with an adhesive.

In another embodiment a capacitive element would be formed by etching Al Foil, anodizing to form dielectric, adding a polymer cathode layer, adding a carbon cathode layer and adding a conductive adhesive layer. Each capacitive element would have a copper foil bonded to the anode extension portion which is electrically isolated from the cathode layers. A plurality of capacitive elements would be interleaved with solid metal current collector plate(s)/layer(s). The capacitive elements and solid metal current collector plates would extend beyond one another. In one embodiment they extend to opposite ends of the device. The capacitive stack would preferably be encapsulated in thermosetting resin. The Encapsulated capacitive stack would be saw diced to reveal anodic copper layer of capacitive elements, and possibly the anode extension, and extension of solid metal current collector plates. At each extension of the anode extension and collector plates an "L" shaped terminal would be applied which wraps around to the bottom, surface mounting, face of the device. The terminals would be soldered to respective electrical members, anodic copper and extensions and solid metal current collecting plates. The legs of the terminals located on the bottom of the device would be adhered to the encapsulant surface with an adhesive.

In another embodiment an Al foil would be etched, anodized to form a dielectric, a polymer cathode layer would be applied followed by a carbon cathode layer and then a conductive adhesive layer to form capacitive element. A Plurality of capacitive elements would be interleaved with solid metal current collector plate(s)/layer(s) to form a capacitive stack wherein the capacitive elements and solid metal current collector plates extend beyond one another. In one embodiment the collective plates and capacitive element extend to opposite ends of the device but they could extend to different portions of the same end or to adjacent ends. The capacitive stack would preferably be encapsulated in thermosetting resin. The encapsulated capacitive stack would be saw diced to reveal anode extensions of capacitive elements, and extensions of solid metal current collector plates. At each end of the device an "L" shaped terminal would be applied which preferably wraps around to the bottom, surface mounting, face of the device. Terminals would be welded to respective electrical members, anode extensions and solid metal current collecting plates. The legs of the terminals located on the bottom of the device would be adhered to the encapsulant surface with an adhesive.

In another embodiment an Al foil would be etched, anodized to form a dielectric, a polymer cathode layer would be applied followed by a carbon cathode layer and then a conductive adhesive layer to form capacitive element. A Plurality of capacitive elements would be interleaved with solid metal current collector plate(s)/layer(s) to form a capacitive stack wherein the capacitive elements and solid metal current collector plates extend beyond one another. In one embodiment the collective plates and capacitive element would be exposed on the "bottom" face of the device, but only near respective ends of the device and there would be no overlap of anode and cathode layers exposed on the bottom face of the device.

Volumetric efficiency as discussed in this document refers to the volume of active capacitance material occupied inside the overall part dimensions. The active capacitance material comprises the region of the anode element that capacitance is derived from. The capacitance is derived from the high surface area region, dielectric and the anode core where the anode core is, in the case of aluminum foil, the aluminum web and in the case of tantalum is the embedded tantalum wire. Calculated volumetric efficiencies are included in the table below. As appreciated from the data presented above the present invention provides a solid electrolytic capacitor with a volumetric efficiency of at least 20%, more preferably at least 30% and even more preferably at least 35%. This is a substantial improvement over the prior art.

|  | EIA Max Case Dimensions (7343-20) | EIA Max Case Volume $mm^3$ (7343-20) | Active Capacitance Material L x W x H | Number of Active Capacitive Elements | Active Capacitance Material Volume | Volumetric Efficiency |
|---|---|---|---|---|---|---|
| Prior Art #1 | L x W x H 7.6 mm x 4.6 mm x 2.0 mm | 70 $mm^3$ | 4.65 mm x 3.5 mm x 0.11 mm | 6 | 10.7 | 15% |
| Prior Art #2 | | | 4.2 mm x 3.0 mm x 0.1 mm | 8 | 10.1 | 14% |
| Proposed Design | | | 6.3 mm x 4.0 mm x 0.11 mm | 9 | 25.0 | 36% |

The present invention has been described with reference to the preferred embodiments without limit thereto. One of skill in the art would realize additional embodiments and alterations which are not specifically enumerated but which are within the scope of the invention as more specifically set forth in the claims appended hereto.

The invention claimed is:

1. A method of forming a solid electrolytic capacitor comprising:
   forming an anode comprising a valve metal or conductive oxide of a valve metal wherein an anode lead extension protrudes from said anode;
   forming a dielectric on said anode;
   forming a cathode layer on said dielectric;
   encasing said anode, said dielectric, and said cathode layer in a non-conducting material encasement;
   exposing said anode lead extension outside of said encasement at a side surface;
   adhering a conductive metal layer to said anode lead extension; and
   electrically connecting a preformed solid metal terminal to said conductive metal layer at said side surface.

2. The method of forming a solid electrolytic capacitor of claim 1 wherein said preformed solid metal terminal is L shaped with a width which is at least 0.4 mm less than the maximum width of said encasement.

3. The method of forming a solid electrolytic capacitor of claim 2 wherein said L shaped preformed solid metal terminal is applied to a bottom face of said capacitor.

4. The method of forming a solid electrolytic capacitor of claim 3 wherein a portion of said L shaped preformed solid metal terminal is adhered to said encasement with an adhesive.

5. The method for forming a capacitor of claim 3 wherein said first face and said second face are on opposing sides of said encasement and said anode terminal and cathode terminal are symmetric.

6. The method of forming a solid electrolytic capacitor of claim 1 wherein said anode lead extension is a valve metal or a conductive oxide of a valve metal.

7. The method of forming a solid electrolytic capacitor of claim 1 wherein said adhering is by a method selected from metal flame spray, chemical vapor deposition, metal sputtering, electroplating, electroless plating and powder metal sintering.

8. The method of forming a solid electrolytic capacitor of claim 1 further comprising zincating said anode lead extension prior to said adhering.

9. The method of forming a solid electrolytic capacitor of claim 8 wherein said conductive metal layer is nickel.

10. The method of forming a solid electrolytic capacitor of claim 1 wherein said electrically connecting comprises a method selected from soldering, conductive adhesive bonding, brazing, nano foil bonding, ultrasonic welding, laser welding, resistance welding and low temperature sintering.

11. The method of forming a solid electrolytic capacitor of claim 1 wherein said cathode layer comprises an intrinsically conductive polymer.

* * * * *